(12) United States Patent
Ernsberger et al.

(10) Patent No.: US 7,240,558 B2
(45) Date of Patent: *Jul. 10, 2007

(54) PRESSURE SENSOR

(75) Inventors: Craig Ernsberger, Granger, IN (US); Robert R. Rainey, Elkhart, IN (US); Patrick B. Blakesley, Goshen, IN (US); Jason Langhorn, South Bend, IN (US)

(73) Assignee: CTS Corporation, Elkhart, IN (US)

( * ) Notice: Subject to any disclaimer, the term of this patent is extended or adjusted under 35 U.S.C. 154(b) by 65 days.

This patent is subject to a terminal disclaimer.

(21) Appl. No.: 10/931,134

(22) Filed: Aug. 31, 2004

(65) Prior Publication Data

US 2005/0103113 A1 May 19, 2005

Related U.S. Application Data

(63) Continuation-in-part of application No. 10/846,759, filed on May 14, 2004, now Pat. No. 6,997,059, which is a continuation-in-part of application No. 10/716,752, filed on Nov. 19, 2003, now Pat. No. 7,093,495.

(51) Int. Cl.
*G01L 9/02* (2006.01)

(52) U.S. Cl. ............................. 73/719; 73/725; 73/734

(58) Field of Classification Search .................. 73/706, 73/719, 721, 720, 726, 727, 734; 361/283.1, 361/283.4
See application file for complete search history.

(56) References Cited

U.S. PATENT DOCUMENTS 4,321,578 A * 3/1982 Nagasu et al. ................ 338/42
4,527,428 A * 7/1985 Shimada et al. .............. 73/721
4,536,820 A * 8/1985 Binder et al. ............. 361/283.1
4,542,435 A * 9/1985 Freud et al. .............. 361/283.4
4,546,653 A * 10/1985 Tobita et al. .................. 73/720
4,587,840 A 5/1986 Dobler et al.

(Continued)

FOREIGN PATENT DOCUMENTS

DE 40 33 707 A1 4/1992

(Continued)

OTHER PUBLICATIONS

The electrical response of thick-film resistors to hydrostatic pressure and uniaxial stress between 77 and 535 K, Nigel Fawcett, Martyn Hill, Sensors and Actuators Journal, vol. 78, pp. 114-119.

(Continued)

*Primary Examiner*—Andre J. Allen
(74) *Attorney, Agent, or Firm*—Mark P. Bourgeois (57) ABSTRACT

A pressure sensor for sensing a pressure level of a pressurized medium. The pressure sensor includes a housing that has a high pressure side, a low pressure side and an aperture. A substrate is located in the aperture. The substrate has a pair of ends and a center portion. The center portion is brazed to the housing in the aperture. The center portion seals the high pressure side from the low pressure side. A pressure sensitive resistor is mounted to one end of the substrate. A reference resistor is mounted to another end of the substrate. A circuit line is located on the substrate. The circuit line is connected between the pressure sensitive resistor and the reference resistor.

14 Claims, 14 Drawing Sheets

U.S. PATENT DOCUMENTS

| | | | |
|---|---|---|---|
| 4,932,266 A * | 6/1990 | Bauer et al. ............... 73/727 |
| 5,197,334 A | 3/1993 | Guziak |
| 5,209,122 A | 5/1993 | Matly et al. |
| 5,317,920 A * | 6/1994 | Kremidas ................. 73/720 |
| 5,587,535 A | 12/1996 | Sasaki et al. |
| 5,867,886 A | 2/1999 | Ratell et al. |
| 5,898,359 A | 4/1999 | Ellis |
| 5,939,637 A | 8/1999 | Pitzer et al. |
| 5,948,989 A | 9/1999 | Ichikawa et al. |
| 6,003,379 A | 12/1999 | Ichikawa et al. |
| 6,003,380 A | 12/1999 | Sasaki et al. |
| 6,022,756 A | 2/2000 | Sparks et al. |
| 6,176,137 B1 | 1/2001 | Sasaki et al. |
| 6,267,010 B1 * | 7/2001 | Hatanaka et al. ............ 73/756 |
| 6,269,534 B1 | 8/2001 | Mattmann et al. |
| 6,725,514 B2 | 4/2004 | Moyer et al. |
| 6,782,755 B2 * | 8/2004 | Tai et al. .................... 73/754 |

FOREIGN PATENT DOCUMENTS

GB      2 187 888 A      9/1987

OTHER PUBLICATIONS

High Pressure Sensor Based on Fusion Bonding, K. Birkelund, M. Sorensen, S. Chiriaev, P. Gravesen, P.B. Rasmussen, Danfoss A/S.

* cited by examiner

PRESSURE SENSOR

CROSS REFERENCE TO RELATED AND CO-PENDING APPLICATIONS

This application is a continuation in part of U.S. patent application Ser. No. 10/846,759, filed May 14, 2004 now U.S. Pat. No. 6,997,059 and entitled, "Pressure Sensor", which is a continuation in part of U.S. patent application Ser. No. 10/716,752, filed Nov. 19, 2003 now U.S. Pat. No. 7,093,495 and entitled, "Pressure Sensor". The entire contents of both applications are herein expressly incorporated by reference.

BACKGROUND

The present invention relates to pressure sensors in general and in particular to a pressure sensor that eliminates the use of a diaphragm between the sensor and pressure to be measured.

Conventional devices for high pressure measurement in severe environments rely on a diaphragm in conjunction with a pressure sensing element. Various pressure sensing elements have been used such as strain gages, piezoresistive devices and semiconductor based sensing elements. These devices are constructed such that the diaphragm is positioned between the pressurized process media and the pressure sensing element. The diaphragms are subject to mechanical fatigue and therefore limit the service life of conventional high pressure sensors. A diaphragm free high pressure sensor as presented herein is therefore desirable.

SUMMARY OF THE INVENTION

It is a feature of the present invention to provide a pressure sensor for sensing pressure of a media and providing an electrical signal that is indicative of the pressure level.

It is a feature of the present invention to provide a pressure sensor for attachment to a pressure vessel that includes a housing that has a high pressure side, a low pressure side and an aperture. A substrate is located in the aperture. The substrate has a pair of ends and a center portion. The center portion is brazed into the housing. The center portion seals the high pressure side from the low pressure side. A pressure sensitive resistor is mounted to one end of the substrate. A reference resistor is mounted to another end of the substrate. A circuit line is located on the substrate. The circuit line is connected between the pressure sensitive resistor and the reference resistor.

BRIEF DESCRIPTION OF THE DRAWINGS

It is noted that the drawings of the invention are not to scale. In the drawings, like numbering represents like elements among the drawings.

DETAILED DESCRIPTION

Referring to FIGS. 1-8, an embodiment of a pressure sensor assembly 20 is shown. Pressure sensor assembly 20 has a housing 22. Housing 22 has a high pressure side 23 and a low pressure side 24. Housing 22 has several parts. Housing 22 has a hexagonal shaped portion 26, an insert 36, a threaded portion 42 and a connector portion 110. Hexagonal shaped portion 26 has sides 27 and 28. Several flat surfaces 31 are placed on the outside of portion 26 so that a wrench can rotate the sensor. An aperture 29 extends through the center of portion 26. A step 30 resides in flange 32. Flange 32 extends from side 27. Portion 26 can be made out of a metal such as stainless steel.

An insert 36 has an inner wall 34, a rim 37, ends 38 and 39 and a bore 45 extending through the insert. The insert 36 fits into aperture 29 with rim 37 resting on step 30. Insert 36 can be made out of a metal such as stainless steel. Insert 36 is laser welded to portion 26 by a weld 122.

A threaded portion 42 is attached to insert 36. Threaded portion 42 has ends 43 and 44 and a bore 45 extending through threaded portion 42. The threads are used to attach the pressure sensor to a pressure vessel (not shown). Threaded portion 42 can be made out of a metal such as stainless steel. Threaded portion 42 is attached to insert 36 by weld 120. A seal ring 47 is attached to end 44. Seal ring 47 is used to seal the pressure sensor to a pressure vessel.

Figure 3:
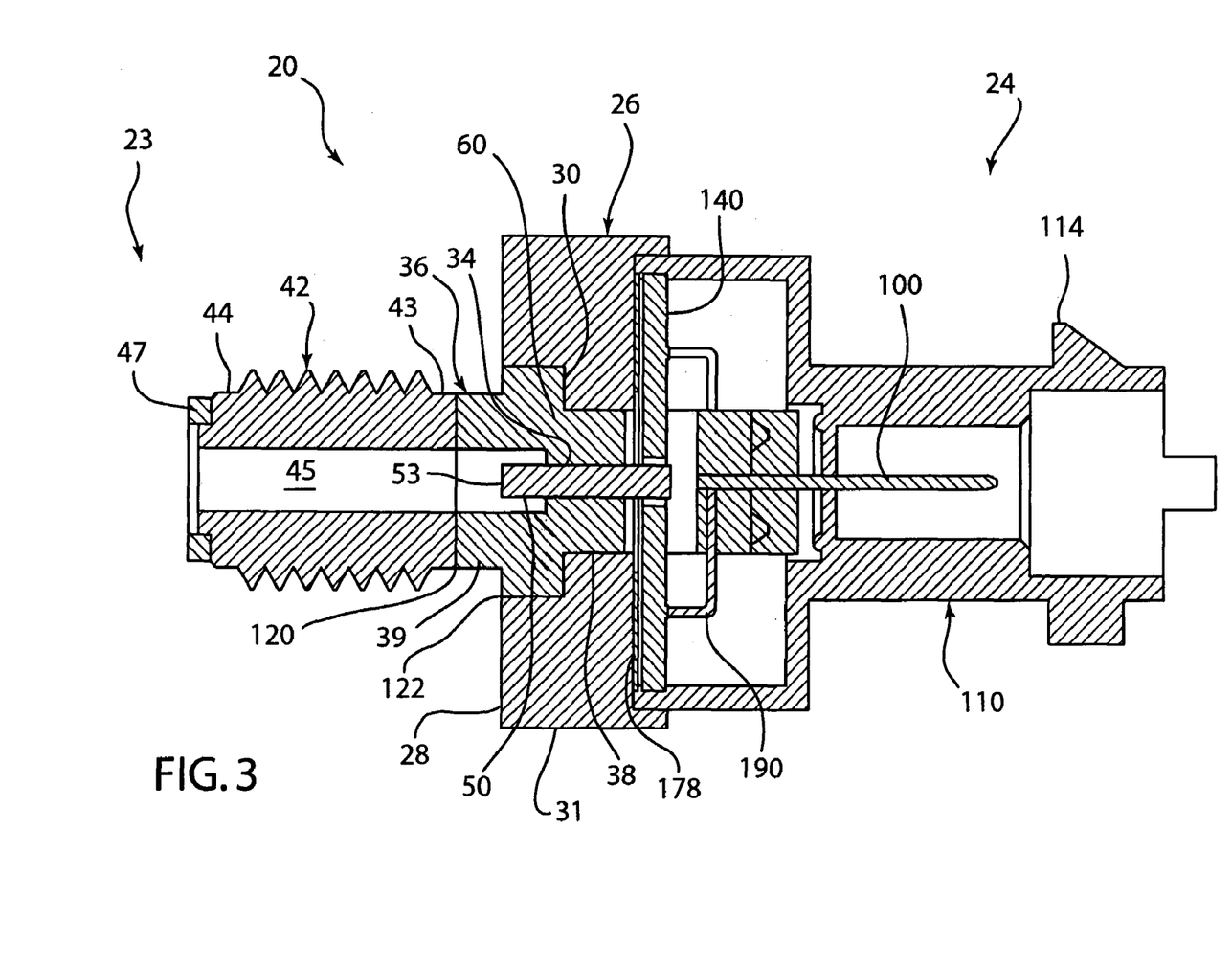
FIG. 3 is a cross-sectional view of the pressure sensor of FIG. 1.
Figure 4:
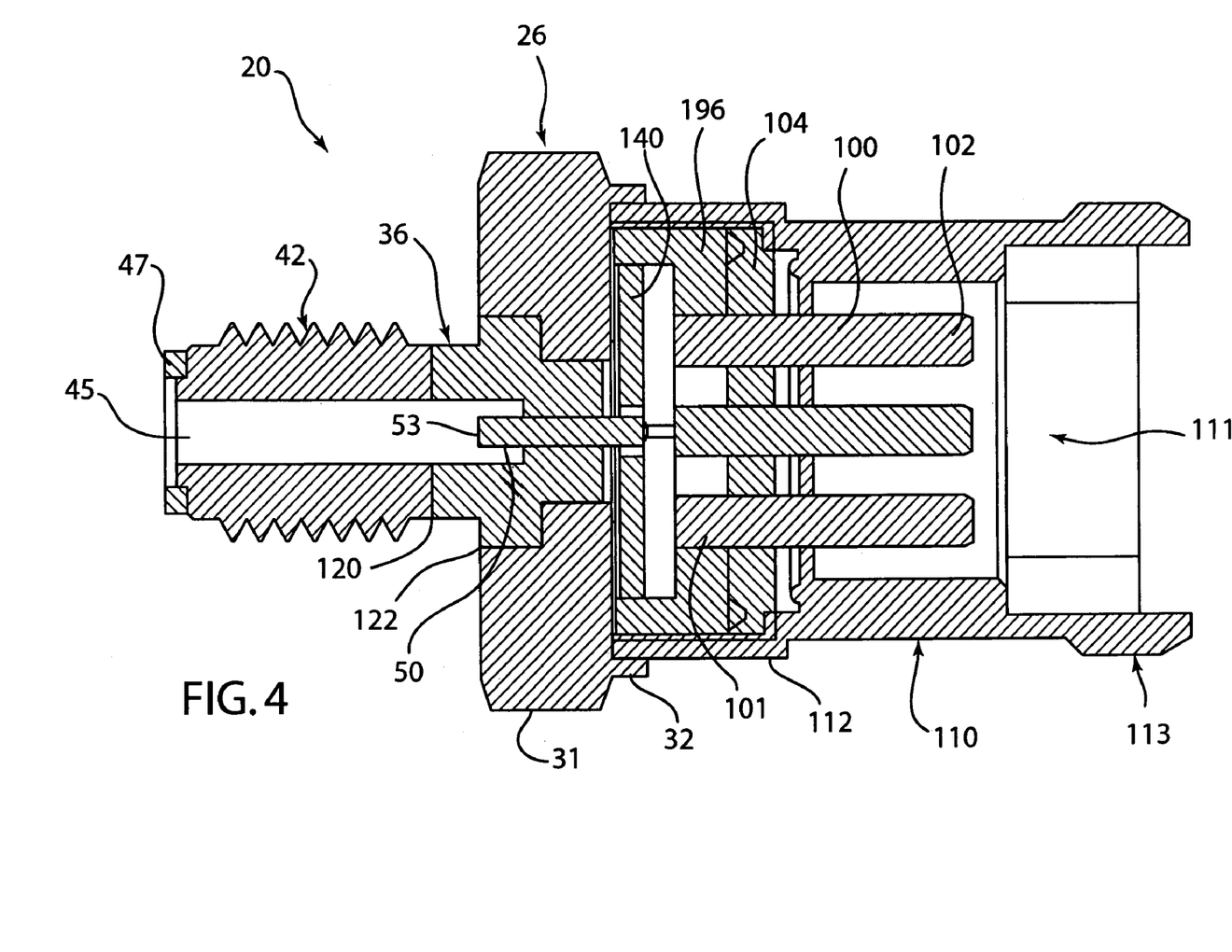
FIG. 4 is another cross-sectional view of the pressure sensor of FIG. 1.
Figure 5:
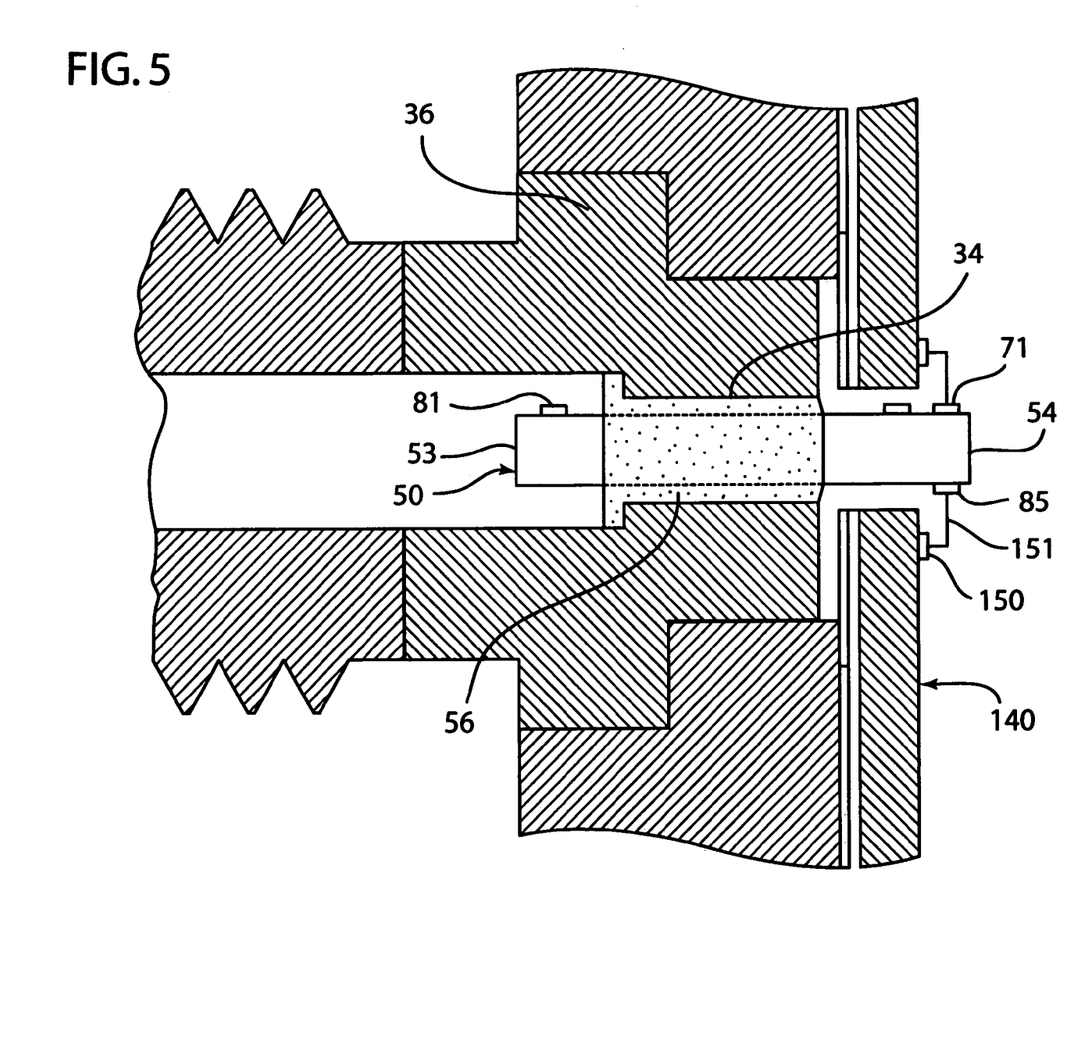
FIG. 5 is an enlarged view of a portion of FIG. 4 showing details of the substrate attachment to the housing.

An elongated block shaped substrate 50 is located inside of bore 45 within insert 36. Substrate 50 has a center section 52 and ends 53 and 54. Center section 52 is coated with a metal such as nickel plated silver. Typically, the silver would be applied by a screening process and then electroplated with nickel. Center section 52 is brazed into bore 45 using a braze alloy 56 of approximately 60% copper 30% silver and 10% tin. The braze alloy 56 is commercially available from Lucas Milhaupt Corporation of Cudahay, Wis. The alloy is placed in the form of a pre-form and then heated to 760 degrees centigrade in a nitrogen reflow furnace. During reflow, the braze alloy wicks along the length of center section 52. The braze alloy fills the space between center section 52 and wall 34. Braze alloy 56 creates a hermetic seal between the high pressure side 23 and low pressure side 24.

Figures 6, 7:
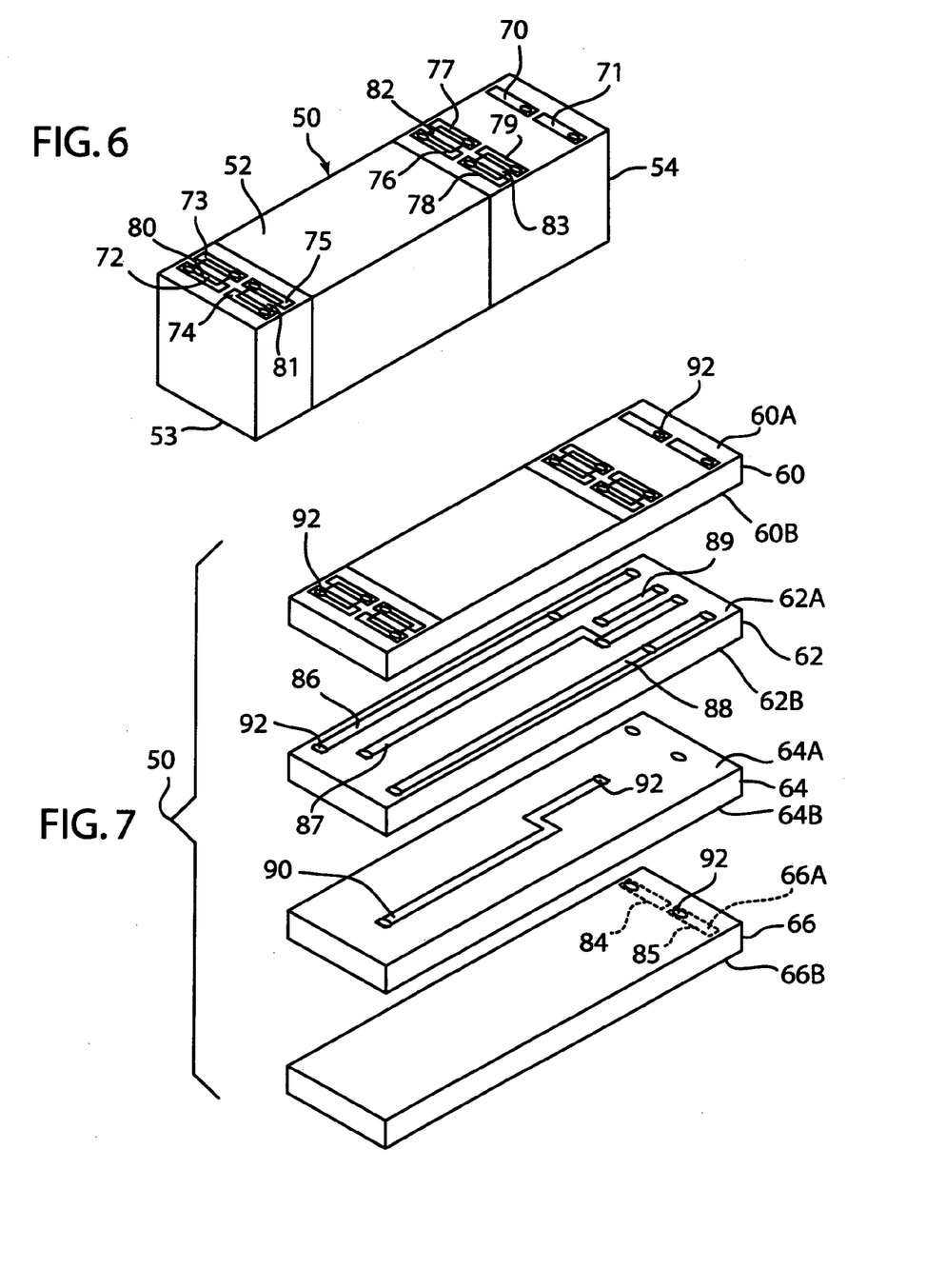
FIG. 6 is a perspective view of an LTCC substrate.
FIG. 7 is an exploded view of FIG. 6.

Substrate 50 can be an alumina ceramic, a low temperature co-fired ceramic, glass or a metal with an applied dielectric surface. Preferably substrate 50 is a low temperature co-fired ceramic (LTCC). Substrate 50 has a top surface 60A and a bottom surface 66B. Substrate 50 is comprised of multiple layers of low temperature co-fired ceramic material. Planar layers 60, 62, 64 and 66 are all stacked on top of each other and form a unitary structure 50 after firing in an oven. LTCC layers 60-66 are commercially available in the form of a green unfired tape from Dupont Corporation. Each of the layers has a top surface, 60A, 62A, 64A and 66A. Similarly, each of the layers has a bottom surface, 60B, 62B, 64B and 66B.

The layers have several circuit features that are patterned on the surfaces. Layer 60 has several circuit features that are patterned on surface 60A. Surface 60A has two terminals 70 and 71 and eight conductor pads 72, 73, 74, 75, 76, 77, 78 and 79. Four resistors 80, 81, 82 and 83 are located on surface 60A. Each resistor is electrically connected between two conductor pads. Resistors 80 and 81 are pressure sensitive resistors. Resistors 82 and 83 are also pressure sensitive resistors. Resistors 82 and 83 have a constant value as they are not exposed to the pressurized medium.

The terminals and conductor pads are formed from an electrically conductive and solderable material. The pressure sensitive resistors 80 and 81 are exposed to the pressurized medium. Resistors 80 and 81 can be conventional thick film resistors that are manufactured using conventional thick film processing techniques. A preferred resistor composition is Heraeus 8241 resistor material, which is commercially available from Heraeus Corporation of West Conshohocken, Pa.

Further information on the manufacture and processing of resistors 80 and 81 can be found in U.S. patent application Ser. No. 10/716,752. The contents of which are herein incorporated by reference in entirety.

Layer 62 has conductor lines 86, 87, 88 and 89 located on surface 62A. Layer 64 has conductor line 90 located on surface 64A. The conductor lines are buried within substrate 50. The conductor lines are electrically connected to the conductor pads and terminals by vias 92. Vias 92 are formed from an electrically conductive material and electrically connect one layer to another layer. Layer 66 has two terminals 84 and 85 located on surface 66B.

The circuit features and vias of substrate 50 are formed by screen printing conventional thick film conductor and via materials on the low temperature ceramic layers. The layers are then stacked onto each other and fired in an oven to produce a unitary part.

Figure 1:
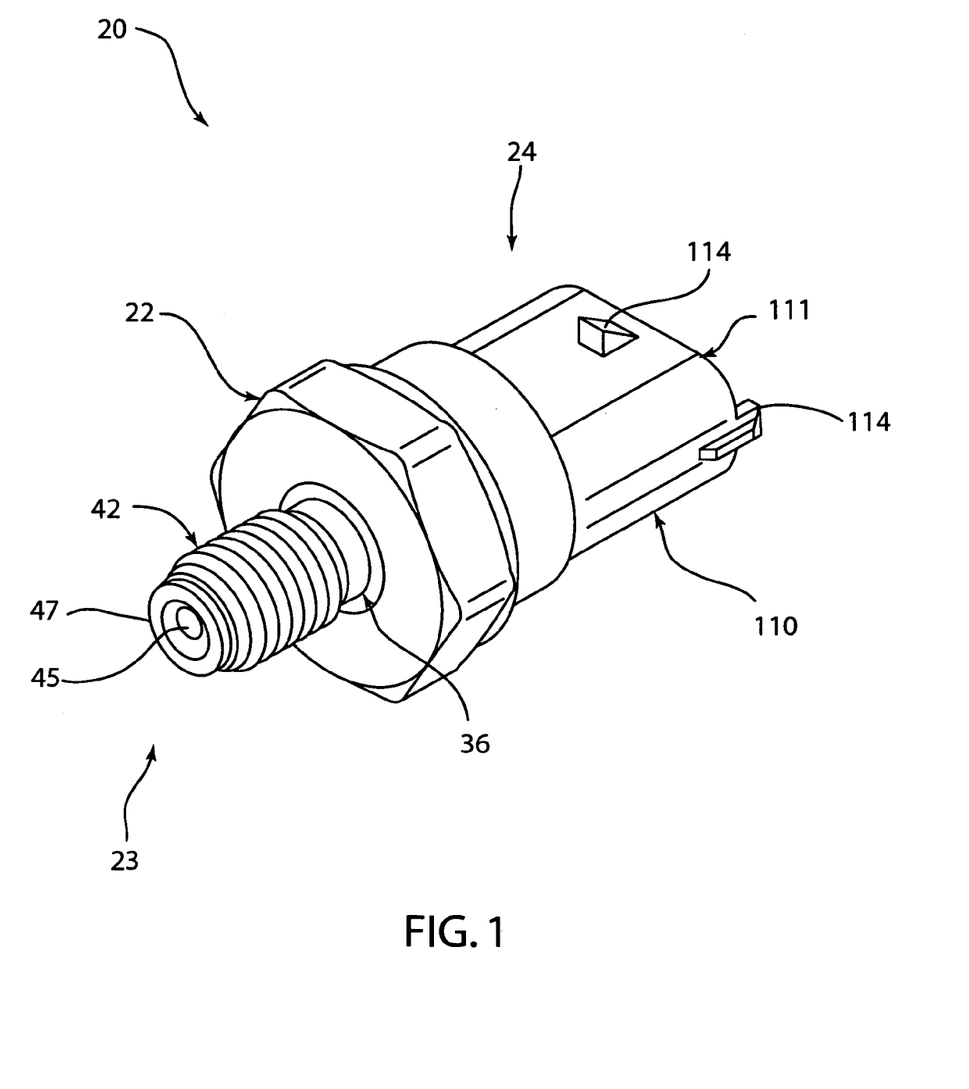
FIG. 1 is a perspective view of a pressure sensor.
Figure 2:
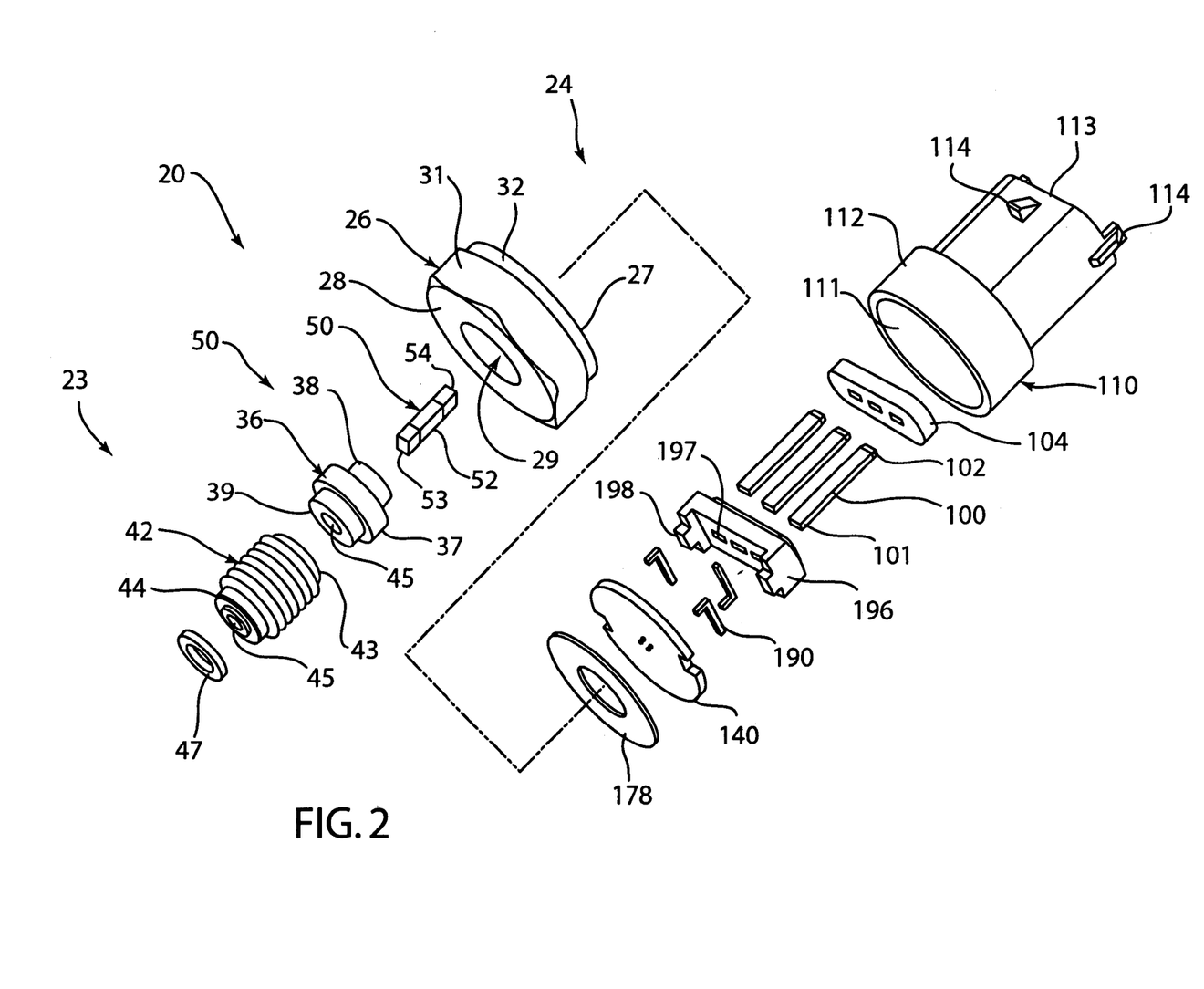
FIG. 2 is an exploded view of the pressure sensor of FIG. 1.
Figure 8:
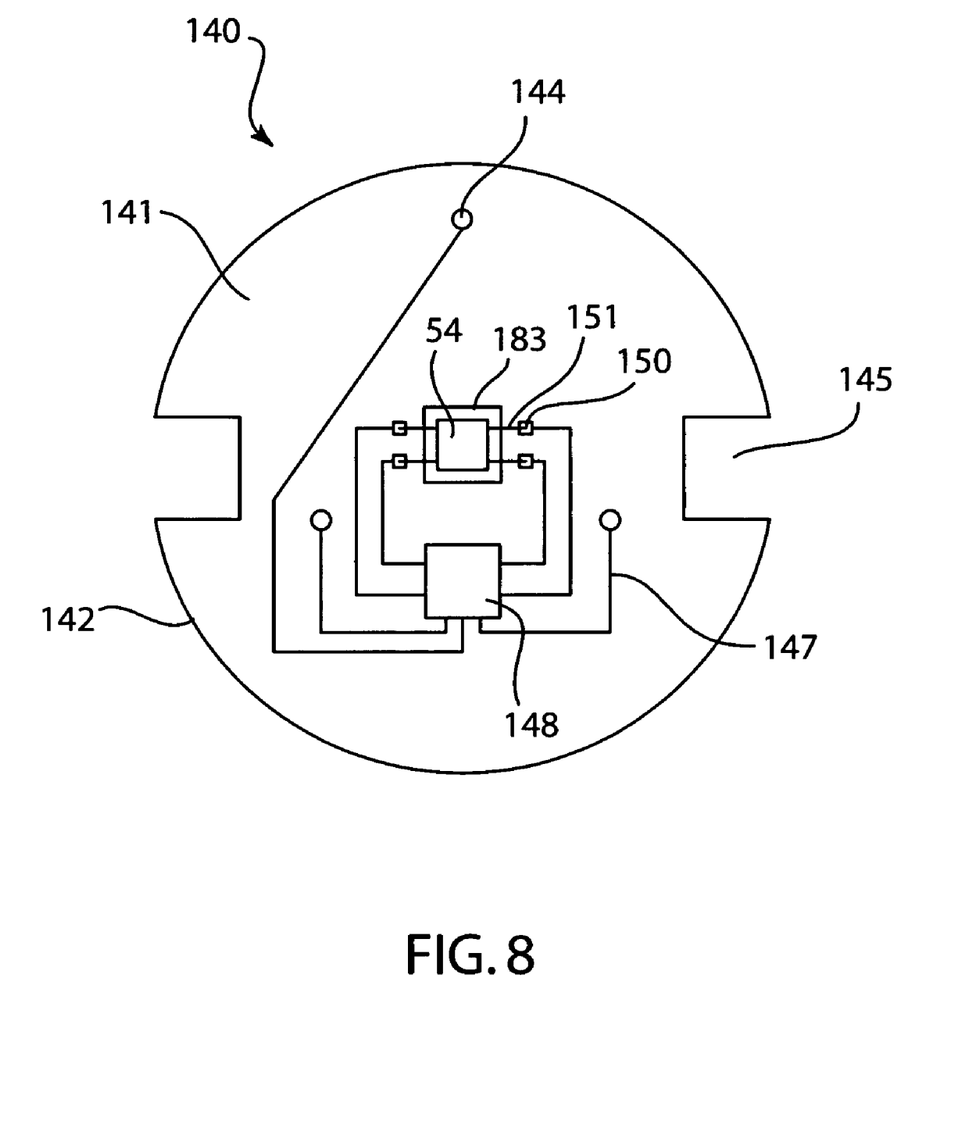
FIG. 8 is a top view of a printed circuit board.

Substrate 50 extends through aperture 29 and into hole 183 of printed circuit board 140. An adhesive disk 178 is sticky on both sides and holds printed circuit board 140 to hexagonal housing side 27.

Printed circuit board 140 has a top side 141, bottom side 142, terminal holes 144, notches 145, terminals 150 and hole 183. An integrated circuit 148 is mounted to top side 141. Integrated circuit 148 is used to condition and amplify an electrical signal coming from the pressure sensitive resistors 80 and 81. Integrated circuit 148 can also contain circuitry for calibration and temperature compensation.

Circuit lines 147 are connected between integrated circuit 148, terminal holes 144 and terminals 150. Four metal leads or wires 151 are soldered between terminals 150 on the printed circuit board and terminals 70, 71, 84 and 85 on substrate 50.

Resistors 80, 81, 82 and 83 are connected to form a Wheatstone bridge. In the Wheatstone bridge, resistors 80 and 81 are called the sense resistors and resistors 82 and 83 are called the reference resistors. Resistors 80 and 81 change resistance in response to pressure changes. Resistors 82 and 83 have a relatively constant value as they are not exposed to changes in pressure.

A voltage is applied across the wheatstone bridge and the voltage change across the bridge is monitored. The pressure level is proportional to the bridge voltage, which changes as the resistance of resistors 80 and 81 change.

Three transfer terminals 190 are held by terminal carrier 196. Terminal carrier 196 has holes 197 and posts 198. Terminal carrier 196 is mounted over printed circuit board 140. Posts 198 fit into notches 145. Transfer terminals 190 have one end soldered into terminal holes 144.

Connector terminals 100 are mounted in holes 197. Connector terminals 100 have ends 101 and 102. Connector terminal end 101 is in electrical contact with transfer terminal 190. Connector terminals 100 supply a voltage to the resistors and allow an output signal to be transmitted from the pressure sensor.

A connector 110 is mounted over terminals 100, terminal carrier 196 and printed circuit board 140. Connector 110 protects the terminals and printed circuit board. Connector 110 can be a molded plastic material. Connector 110 has a cavity 111, ends 112, 113 and latch tabs 114. End 112 fits into flange 32. Seal 104 is located between terminal carrier 196 and connector 110. Seal 104 prevents contamination from outside the connector from entering the area of the printed circuit board. Latch tabs 114 are designed to retain an external wiring harness (not shown). The wiring harness would mate with terminals 100 and would connect to another external electronic circuit (not shown).

Resistors 80 and 81 change resistance in response to the applied pressure level. The resistance across the resistors is about 410 ohms when the pressurized medium is pressurized to 5000 pounds per square inch. The resistance across the resistors is about 360 ohms when the pressure is 50,000 pounds per square inch. The resistance value is linear with pressure.

Pressure sensor 20 is most useful for measuring large changes in pressure and for use with high pressures. This is due to the fact that the resistance change with pressure is small over a large pressure range. Pressure sensor 20 is best used with pressure ranges above 500 pounds per square inch. Pressure sensor 20 can be used to detect pressures down to 0 pounds per square inch (gauge pressure).

Assembly

Pressure sensor 20 can be assembled in the following sequence:
1. Substrate 50 is placed in bore 45 of housing insert 36 adjacent to wall 34.
2. A braze alloy 56 preform is placed adjacent to center portion 52.
3. The substrate 50, braze alloy 56 and housing 36 are placed in an oven at 760 degree Centigrade where the braze alloy wicks along the length of the center section 52 forming a hermetic seal.
4. Insert 36 is placed in hex housing 26 and laser welded in place with weld 122.
5. Threaded portion 42 is placed next to insert 36 and laser welded in place with weld 120.
6. Seal ring 47 is attached to end 44 of the threaded portion.
7. Adhesive disc 178 is placed on side 27.
8. Circuit board 140 is mounted over adhesive disk 178 with substrate end 54 extending through hole 183.
9. Metal leads 151 are soldered between terminals 150 and terminals 70, 71, 84 and 85.

10. Transfer terminals 190 are soldered into holes 144.
11. Terminals 100 are inserted in terminal carrier 196.
12. Terminal carrier 196 is placed over circuit board 140 with posts 198 engaged in notches 145. Terminals 100 are in contact with transfer terminals 190.
13. Seal 104 is placed over terminals 100.
14. Connector shroud 110 is placed over terminals 100 with end 112 press fit into flange 32.

Second Embodiment

Figure 9:
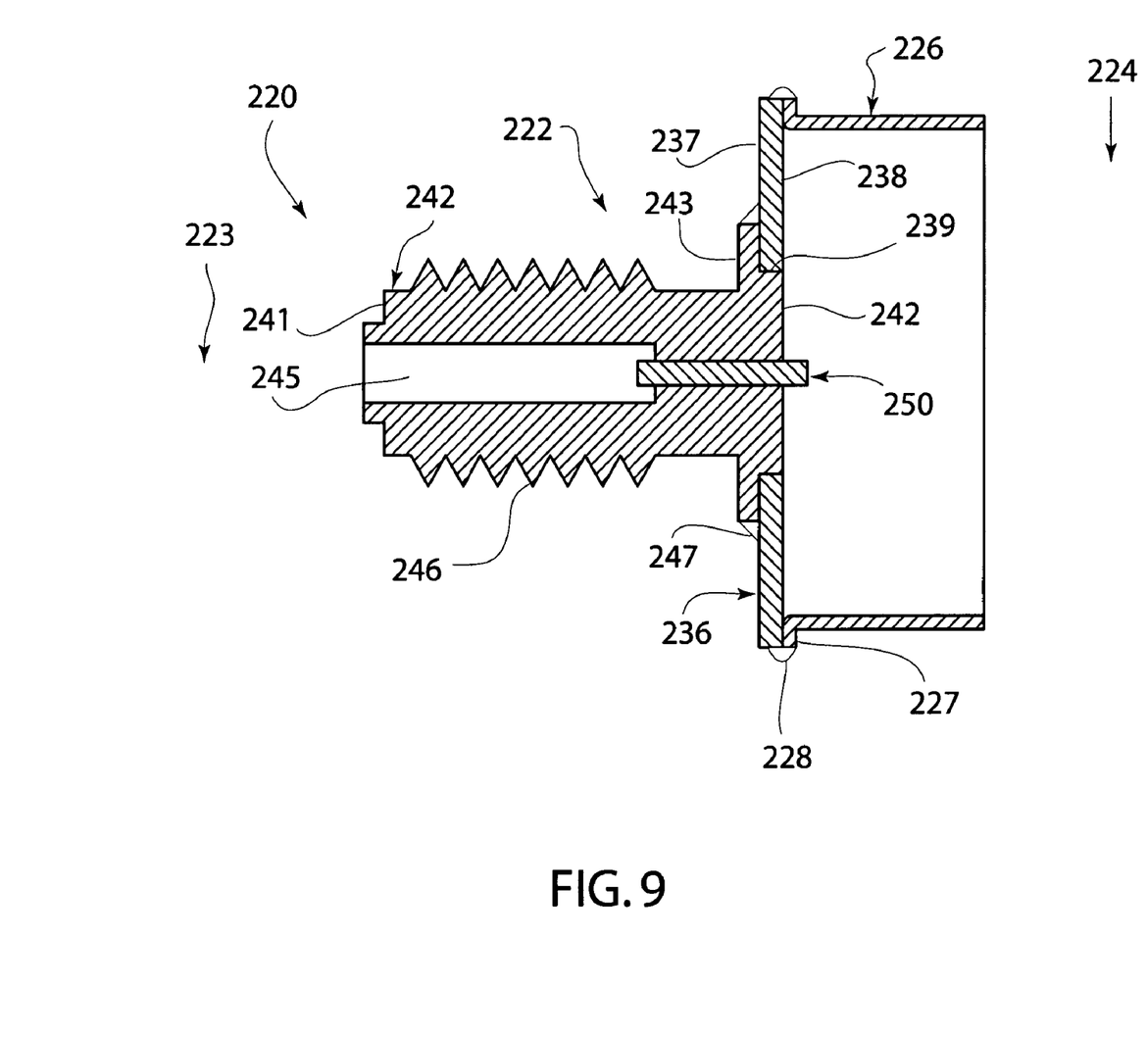
FIG. 9 is a cross-sectional view of an alternative embodiment of a pressure sensor housing.

Turning to FIG. 9, a cross-sectional view of an alternative embodiment of a pressure sensor 220 is shown. Housing 222 has a high pressure side 223 and a low pressure side 224. Housing 222 has several parts. Housing 222 has a hexagonal shaped portion 226, a washer portion 236 and a threaded portion 242. For simplicity the connector portion and printed circuit board are not shown. Hexagonal shaped portion 226 has a lip 227 that is welded to portion 236 by a weld 228. Housing 222 can be made out of a metal such as stainless steel.

Washer portion 236 has surfaces 237 and 238 and a hole 239. Threaded portion 242 has ends 241, 242, rim 243, bore 245 and threads 246. End 242 fits into hole 239 with rim 243 resting on surface 237. Portion 242 is laser welded to washer portion 236 by a weld 247. The threads are used to attach the pressure sensor housing to a pressure vessel (not shown). Substrate 250 can be sealed into bore 245. The remainder of the pressure sensor assembly would be the same as for the previously described pressure sensor 20.

Referring now to FIGS. 10-15, a perspective view of an alternative embodiment of an alumina substrate is shown. In FIGS. 12-15, the center dielectric and metal material are removed to show details of the resistors and conductors. An elongated block shaped substrate 250 has a center section 252, ends 253 and 254, top surface 255, bottom surface 256, and side surfaces 257 and 258. Center section 252 is coated with a metal 260 such as nickel plating over a thick film conductor 261 such as silver. The thick film conductor would be applied by a screening process and then electroplated with nickel. Center section 252 is brazed into bore 45 or 245 the same as for pressure sensor 20. The braze alloy is approximately 60% copper 30% silver and 10% tin. The braze alloy creates a hermetic seal between the high pressure side and low pressure side of the housing.

Substrate 250 is formed from high temperature alumina ceramic. Several circuit features are patterned on the surfaces of substrate 250. Top surface 255 has a pressure sensitive resistor 280 and two conductor lines 272 and 273. Bottom surface 256 has a pressure sensitive resistor 281 and two conductor lines 274 and 275. Side surface 257 has a resistor 282 and two conductor lines 276 and 277. Side surface 258 has a resistor 283 and two conductor lines 278 and 279. Each resistor is electrically connected between two conductor lines.

The conductor lines are formed from an electrically conductive and solderable material. The pressure sensitive resistors 280 and 281 are exposed to the pressurized medium. The resistors and circuit lines can be conventional thick film resistors and conductors that are manufactured using the same techniques as described for substrate 50.

A dielectric material 290 (FIGS. 10 and 11) covers the circuit lines in center section 252. Dielectric material 290 has two sections 290A and 290B that are deposited in separate steps. Thick film conductor 261 is screen printed over dielectric 290B and then electroplated with nickel 260.

Third Embodiment

Figure 16:
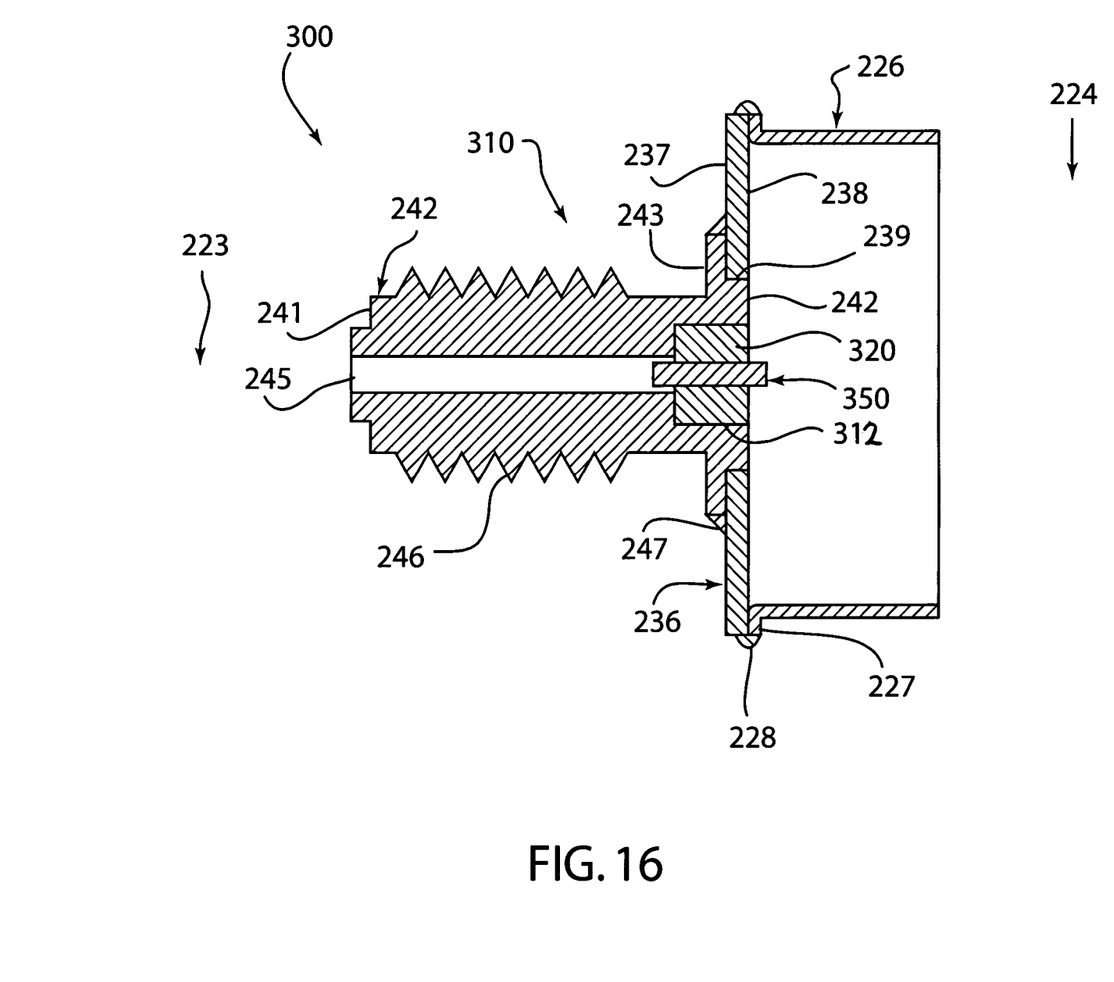
FIG. 16 is a cross-sectional view of an alternative embodiment of a pressure sensor housing.
Figure 17:
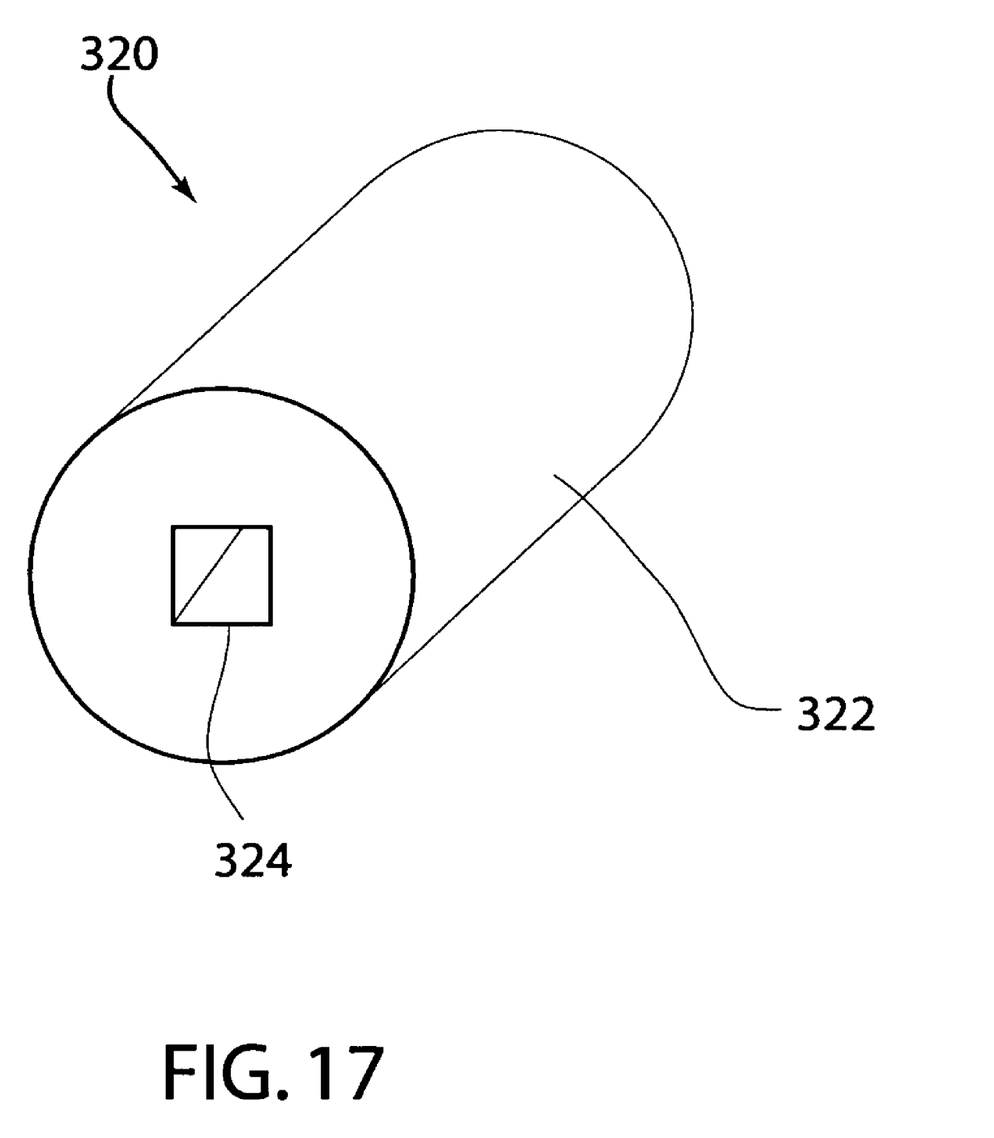
FIG. 17 is a perspective view of a glass pre-form.
Figure 18:
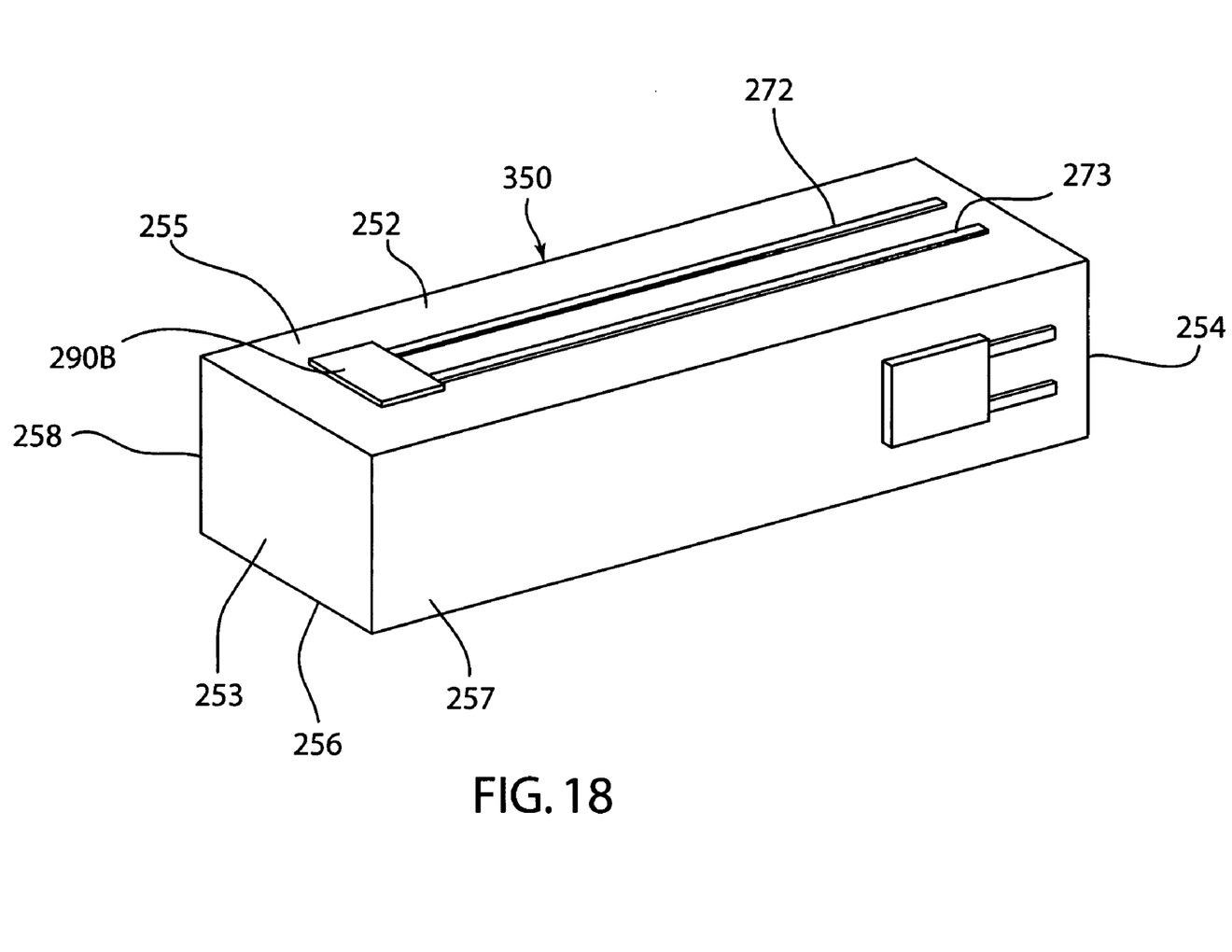
FIG. 18 is a perspective view of an alternative embodiment of an alumina substrate.

Turning to FIGS. 16-18, a cross-sectional view of another embodiment of a pressure sensor 300 is shown. Housing 310 has a high pressure side 223 and a low pressure side 224. Housing 310 has several parts. Housing 310 has a hexagonal shaped portion 226, a washer portion 236 and a threaded portion 242. For simplicity the connector portion and printed circuit board are not shown. Hexagonal shaped portion 226 has a lip 227 that is welded to portion 236 by a weld 228. Housing 310 can be made out of a metal such as stainless steel.

Washer portion 236 has surfaces 237 and 238 and a hole 239. Threaded portion 242 has ends 241, 242, rim 243, bore 245, threads 246 and cavity 312. End 242 fits into hole 239 with rim 243 resting on surface 237. Portion 242 is laser welded to washer portion 236 by a weld 247. The threads are used to attach the pressure sensor housing to a pressure vessel (not shown).

A glass pre-form 320 is mounted in cavity 312. Glass pre-form 320 has an outer surface 322 and a square bore or hole 324. Substrate 350 is mounted into bore 324. Glass pre-form 320 forms a glass to ceramic seal between threaded portion 242 and substrate 350. During manufacturing, substrate 350 would be placed into bore 324 and then glass pre-form 320 placed into cavity 312. The preform, substrate and threaded portion 242 are then placed in an oven where the glass is sintered to the threaded portion and the substrate forming a hermetic seal.

The remainder of the pressure sensor assembly would be the same as for the previously described pressure sensor 20.

Figure 10:
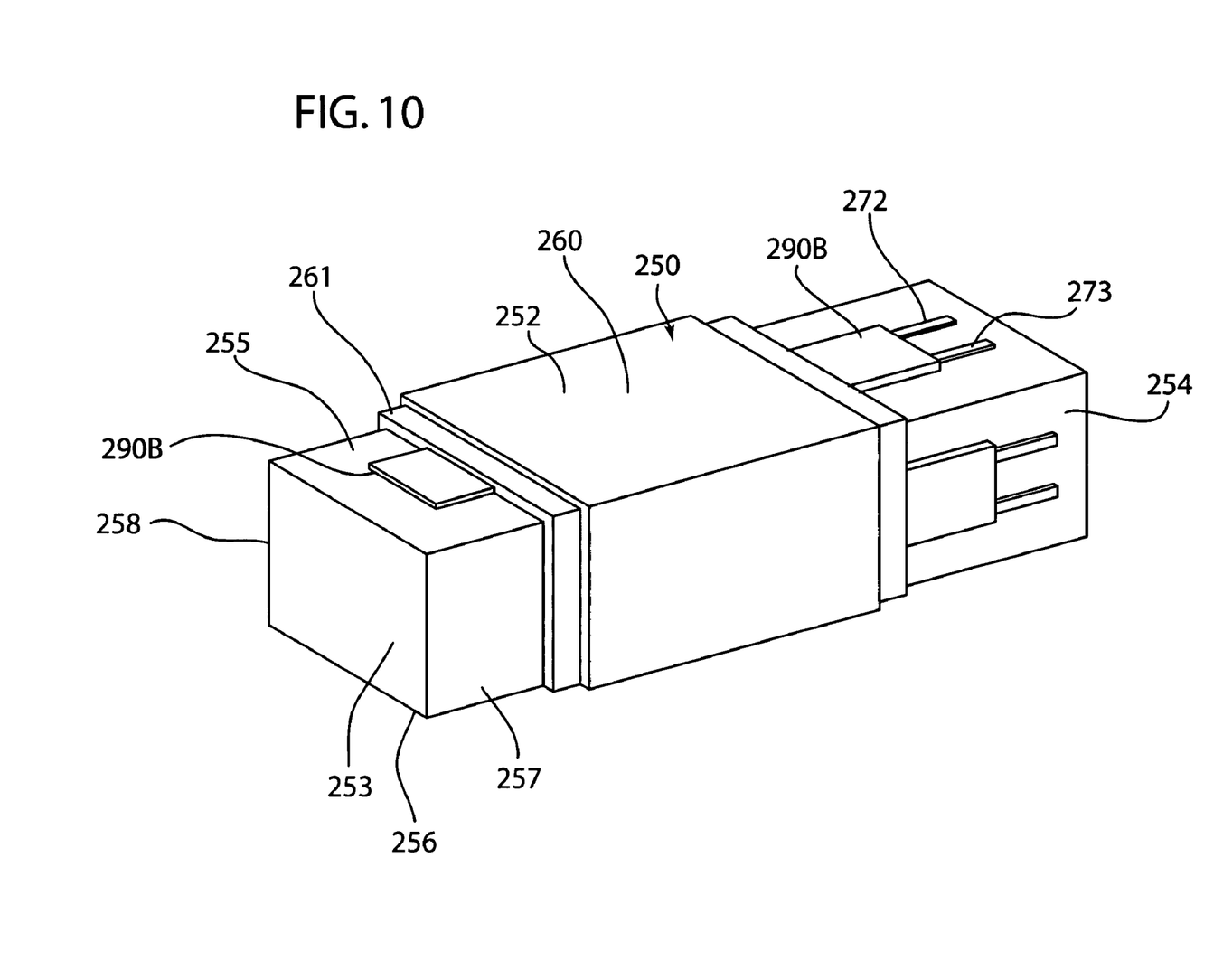
FIG. 10 is a perspective view of an alternative embodiment of an alumina substrate.
Figure 11:
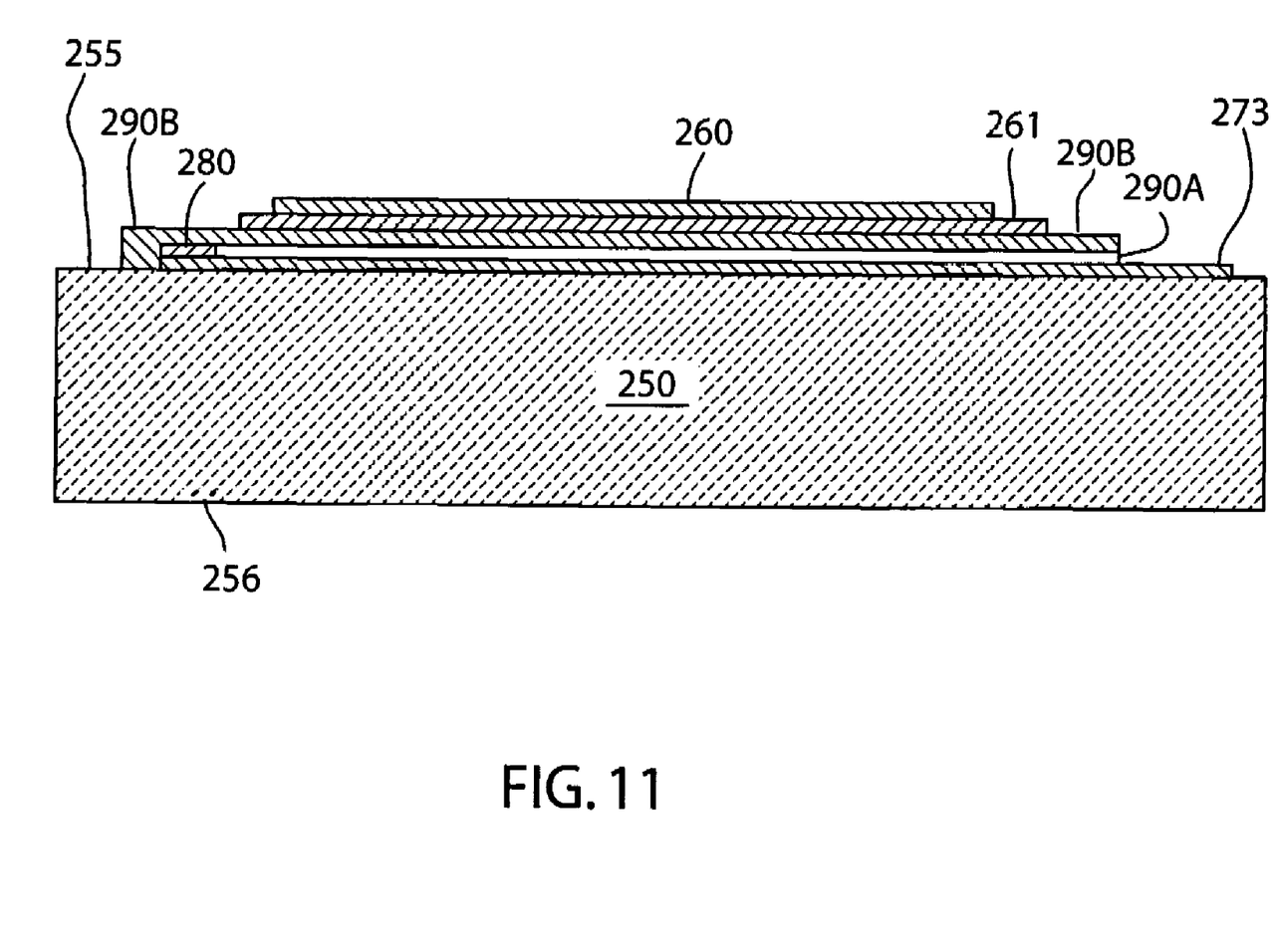
FIG. 11 is a cross-sectional view of FIG. 10 taken along section line A-A.
Figures 12, 13:
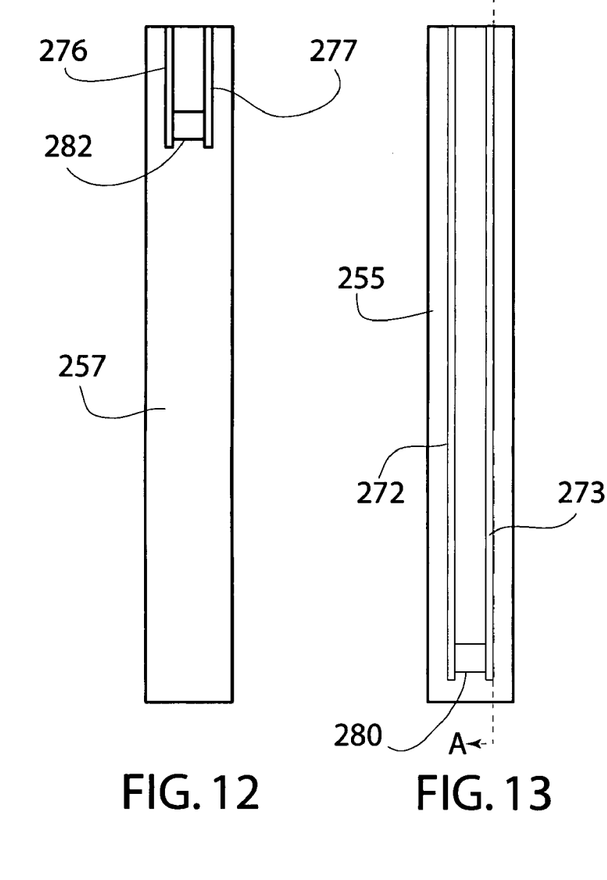
FIG. 12 is a right side view of FIG. 10 without the center dielectric and metal.
FIG. 13 is a top view of FIG. 10 without the center dielectric and metal.
Figure 14:
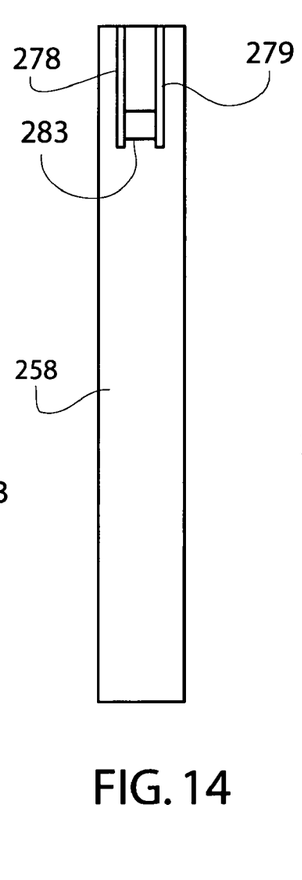
FIG. 14 is a left side view of FIG. 10 without the center dielectric and metal.
Figure 15:
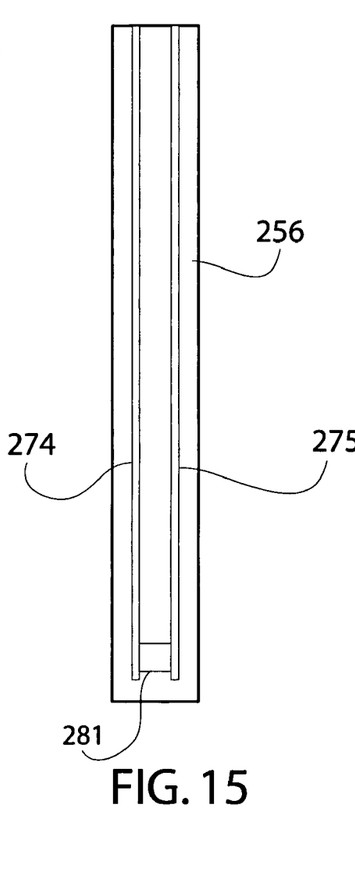
FIG. 15 is a bottom view of FIG. 10 without the center dielectric and metal.

Alumina substrate 350 is the same as substrate 250 of FIG. 10 except that the dielectric, silver thick film and nickel plating in center section 252 are removed. The dielectric material 290B in FIG. 18 only covers the resistors.

Discussion

One of ordinary skill in the art of designing and using pressure sensors will realize many advantages from using the present invention. The elimination of the diaphragm of prior art sensors eliminates one of the major sources of sensor error and failure and also results in a lower cost assembly.

An additional advantage of the present invention is improved accuracy. Since the pressure sensitive resistors are in direct contact with the pressure vessel, the sensor can react directly to changes in pressure. Sensors of the prior art have a diaphragm located between the sensor and the pressure vessel. The diaphragm reduces response time and accuracy of the sensor.

Another advantage of the present invention is that the pressure sensor can be assembled at low cost.

Another advantage of the present invention is that the use of the braze alloy or glass results in a hermetic seal that is highly reliable.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pressure sensor for attachment to a pressure vessel comprising:
   a) a housing having a high pressure side, a low pressure side and an aperture extending therethrough;
   b) a substrate located in the aperture, the substrate having a first end, a second end and a center portion, the center portion affixed to the housing, the center portion sealing the high pressure side from the low pressure side;
   c) at least one pressure sensitive resistor mounted on the first end;
   d) at least one reference resistor mounted on the second end; and
   e) a circuit line located on the substrate, the circuit line connected between the pressure sensitive resistor and the reference resistor.

2. The pressure sensor according to claim 1, wherein a threaded portion is connected to the high pressure side of the housing.

3. The pressure sensor according to claim 1, wherein the substrate is a low temperature co-fired ceramic.

4. The pressure sensor according to claim 1, wherein vias extend through the substrate and connect the circuit line to the resistors.

5. The pressure sensor according to claim 1, wherein the second end is connected to a printed circuit board.

6. The pressure sensor according to claim 1, wherein the resistor has conductor pads attached to both ends, the conductor pads located on the substrate.

7. The pressure sensor according to claim 1, wherein the center portion has a metallized area that is brazed in the aperture.

8. A pressure sensor for sensing a pressure level of a pressurized medium, comprising:
   a) a housing having a high pressure side, a low pressure side and an aperture extending therethrough;
   b) a substrate brazed into the aperture, the substrate sealing the high pressure side from the low pressure side;
   c) a first and second resistor mounted to the substrate on the high pressure side, the first and second resistors being exposed to the pressurized medium;
   d) a third and fourth resistor mounted to the substrate on the low pressure side; and
   e) a first and second circuit line mounted to the substrate, the first and second circuit line connecting the resistors into a wheatstone bridge.

9. The pressure sensor according to claim 8, wherein the ceramic substrate has a metallized center portion, the metallized center portion brazed to the housing.

10. The pressure sensor according to claim 8, wherein the ceramic substrate is mounted to an insert, the insert being welded to the housing.

11. The pressure sensor according to claim 8, wherein the substrate is a low temperature co-fired ceramic.

12. The pressure sensor according to claim 8, wherein the first and second circuit lines are connected to a printed circuit board.

13. The pressure sensor according to claim 12, wherein a terminal carrier and a plurality of terminals are connected to the printed circuit board.

14. The pressure sensor according to claim 13, wherein a connector shroud is mounted to the housing, the terminals extending into the connector shroud.

* * * * *